(12) United States Patent
Yamamoto

(10) Patent No.: US 8,641,291 B2
(45) Date of Patent: Feb. 4, 2014

(54) COMB-SHAPED RESIN RETAINER AND ROLLER BEARING

(75) Inventor: Naota Yamamoto, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/883,724

(22) PCT Filed: Nov. 2, 2011

(86) PCT No.: PCT/JP2011/075263
§ 371 (c)(1),
(2), (4) Date: May 6, 2013

(87) PCT Pub. No.: WO2012/063694
PCT Pub. Date: May 18, 2012

(65) Prior Publication Data
US 2013/0223785 A1 Aug. 29, 2013

(30) Foreign Application Priority Data
Nov. 10, 2010 (JP) .................................. 2010-251418

(51) Int. Cl.
*F16C 23/08* (2006.01)
*F16C 33/56* (2006.01)

(52) U.S. Cl.
USPC .......................................... 384/576; 384/558

(58) Field of Classification Search
USPC ................... 384/558, 572, 576, 577
See application file for complete search history.

(56) References Cited

U.S. PATENT DOCUMENTS

| 7,530,743 | B2 | 5/2009 | Yakura et al. |
| 2005/0041901 | A1 | 2/2005 | Yakura et al. |
| 2010/0021097 | A1* | 1/2010 | Uchida et al. ................. 384/492 |

FOREIGN PATENT DOCUMENTS

| JP | 43-020807 | 9/1943 |
| JP | 2006-292178 | 10/2006 |
| JP | 2007-78118 | 3/2007 |
| JP | 2007-278406 | 10/2007 |
| JP | 2008-202755 | 9/2008 |
| JP | 2009068592 A * | 4/2009 |
| JP | 2009085257 A * | 4/2009 |

OTHER PUBLICATIONS

International Search Report mailed on Jan. 24, 2012 in corresponding International Application PCT/JP2011/075263.
PCT International Preliminary Report on Patentability mailed May 23, 2013 in corresponding International Application No. PCT/JP2011/075263.

* cited by examiner

*Primary Examiner* — Phillip A Johnson

(57) ABSTRACT

A comb-shaped resin retainer includes an annular section and a plurality of pillar sections which protrude to one side in the axial direction from one side of the annular section. A gap between the pillar sections, adjacent to each other in the circumferential direction serves as a pocket for retaining a cylindrical roller. A side face of the pillar section which serves as the inner face of the pocket is formed in a recessed shape. Each pillar section is tilted so as to become closer to the retainer axial center as the pillar section extends toward the tip of the pillar section. A flat portion is provided on the side face of the pillar section which serves as the inner face of the pocket. The flat portion continues axially from the tip portion of the pillar section to the base end portion thereof.

9 Claims, 7 Drawing Sheets

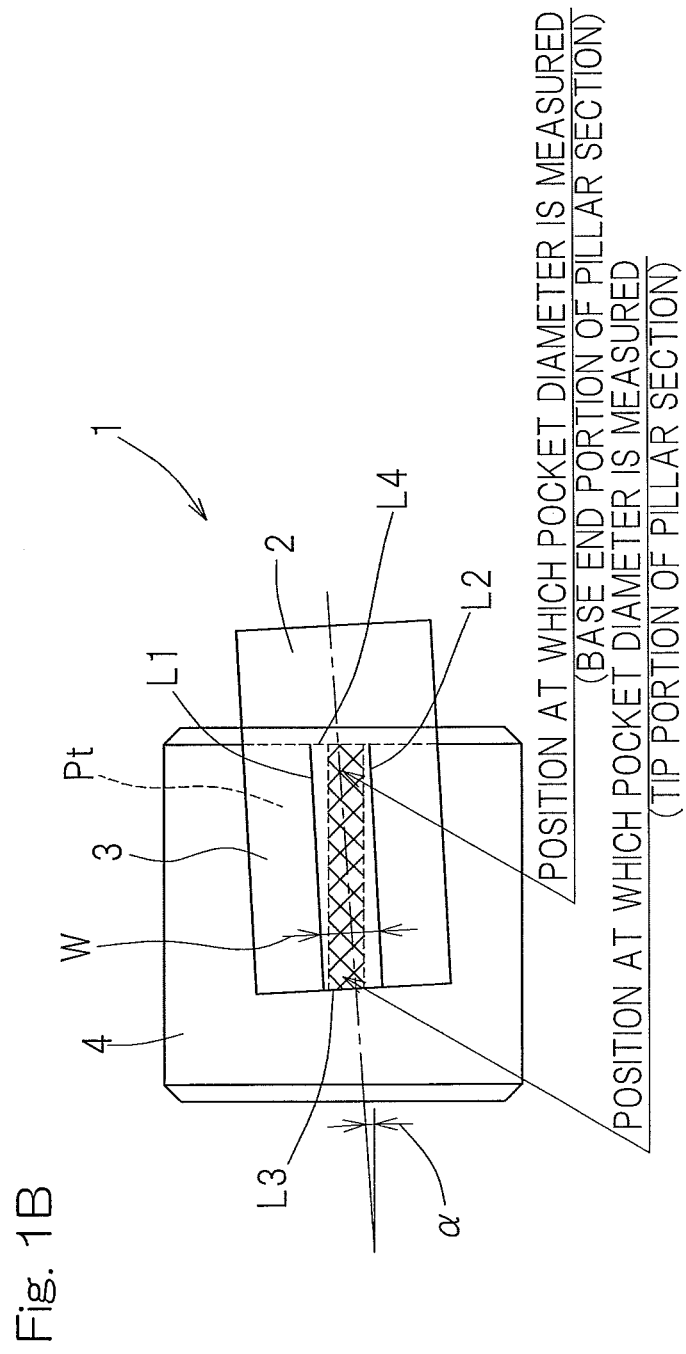

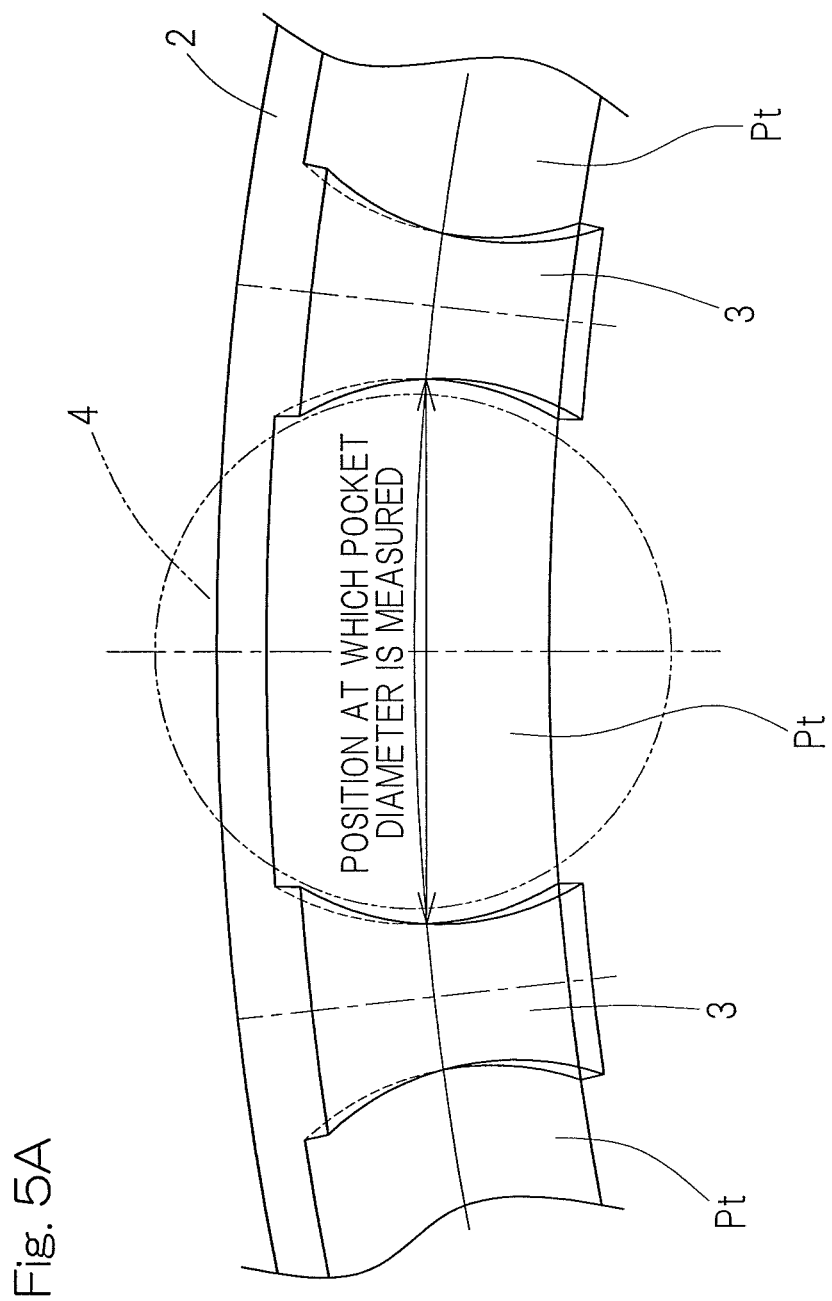

COMB-SHAPED RESIN RETAINER AND ROLLER BEARING

CROSS REFERENCE TO THE RELATED APPLICATION

This application is a U.S. national stage application of PCT/JP 2011/075263 filed Nov. 2, 2011 and claims foreign priority benefit to Japanese patent application No. 2010-251418, filed Nov. 10, 2010, the entire disclosures of which are herein incorporated by reference as a part of this application.

BACKGROUND OF THE INVENTION

1. Field of the Invention

The present invention relates to a comb-shaped resin retainer and a roller bearing applied to, for example, a double row cylindrical roller bearing or the like which supports the main shaft of a machine tool.

2. Description of Related Art

A so-called comb-shaped resin retainer has been proposed in a cylindrical roller bearing which supports the main shaft or the like of a machine tool. As shown in FIGS. 6A and 6B, this comb-shaped resin retainer includes an annular section 20 and a plurality of pillar sections 21 which protrude to one side in the axial direction from one side face of the annular section 20. A gap between the pillar sections 21, 21 adjacent to each other in the circumferential direction serves as a pocket Pt for retaining a cylindrical roller 22. Many comb-shaped resin retainers are manufactured by injection molding. Any deformation caused by molding shrinkage may form an angle of inclination at a comb tooth section, i.e., a pillar section relative to a retainer center axis. Thus, a mold structure may be prepared in anticipation of the molding shrinkage (Patent Document 1).

PRIOR ART DOCUMENT

[Patent Document 1] JP Laid-open Patent Publication No. 2007-78118

[Patent Document 2] JP Laid-open Patent Publication No. 2007-278406

SUMMARY OF THE INVENTION

Problems to be Solved by the Invention

In a mold, if a portion to mold a pillar section is set at an angle of 90 degrees relative to a portion to mold an annular section, there will arise following problems. Since the pillar section of a resin retainer is tilted due to molding shrinkage, the width of a pocket can be different between the base end portion of the pillar section and the tip portion thereof along an axial straight line on the pillar section. In such a case, a roller and the retainer partially contacts, and as a result, local wear is easily generated. In order to solve this problem, a compound curved surface has been proposed in which the radius of a pocket is increased and a circumferential side face of each pillar section is formed by continuing an outer diametric side recessed curved surface portion and an inner diametric side recessed curved surface portion (Patent Document 2).

The angle of a pillar section often faces inward in a radial direction. If the angle of the pillar section faces outward in the radial direction, the amount of movement of a roller is increased and the strong contact between the roller and the retainer tends to occur by the influence of centrifugal force. In order to change the target angle in a mold so that a pocket is in parallel to a retainer axial direction after the molding shrinkage, it is necessary to adjust the mold several times to thereby increase the cost of manufacturing.

In case of controlling the width of a pocket, when the pocket width between the pillar sections along any axial straight line is measured, it is difficult to measure at the same position of a base end portion and a tip portion of each pillar section. Therefore, a problem of quality assurance is concerned.

An object of the present invention is to provide a comb-shaped resin retainer and a roller bearing in which the amount of movement of a roller is stable, the wear of a retainer is reduced, the manufacturing cost thereof is reduced, and the width of a pocket can be accurately controlled.

Means for Solving the Problems

A comb-shaped resin retainer of the present invention includes an annular section and a plurality of pillar sections which protrude to one side in an axial direction from one side face of the annular section. A gap between the pillar sections adjacent to each other in a circumferential direction serves as a pocket for retaining a roller, and a side face of the pillar section, which serves as an inner face of the pocket, is formed in a recessed shape. Each of the pillar sections is tilted so as to become closer to a retainer axial center as the pillar section extends toward a tip of the pillar section, and a flat portion is provided on the side face of the pillar section which serves as the inner face of the pocket, and the flat portion continues axially from a tip portion of the pillar section toward a base end portion thereof, and the opposing flat portions of the pillar sections are in parallel to each other. The "flat portion" forms a planar surface.

According to this structure, in the comb-shaped resin retainer in which the side face of the pillar section which serves as the inner face of the pocket is formed in a recessed shape, the flat portion is provided on the side face of the pillar section which serves as the inner face of the pocket. Thus, the maximum width of the pocket can be measured at any axial position of the pillar section. The flat portion continues axially from the tip portion of the pillar section to the base end portion thereof. Accordingly, even when a pocket width of the pillar section is measured at any axial position of the pillar section from the tip portion of the pillar section to the base end portion thereof, by measuring the flat portion, the pocket width can be controlled accurately. Hence the pocket width and the gap of the roller can be set so as not to vary in the axial direction. Consequently, a uniform contact between the roller and the retainer can easily be obtained. Furthermore, since each of the pillar sections is tilted so as to become closer to the retainer axial center as the pillar section extends toward the tip thereof, the amount of movement of the roller is not increased by the influence of centrifugal force, and the strong contact between the roller and the retainer can be prevented. As a result, the wear of the retainer can be reduced. Also, because it is not necessary to carry out mold-adjustment of the comb-shaped resin retainer multiple times, the manufacturing cost thereof can be reduced.

The roller may be a cylindrical roller.

When a radial width of the flat portion of the pillar section is represented by W, an inclination angle of the pillar section relative to the retainer axial center is represented by $\alpha$, and an axial length of the flat portion is represented by L, the flat portion may have the following relationship:

$$W > \tan\alpha \times L$$

The width W is a widthwise dimension of the flat portion at an arbitrary axial position of the pillar section.

When the axial length of the pillar section becomes long, the necessary axial length of the flat portion also becomes long. Further, when the angle of the pillar section subjected to molding shrinkage is determined, the width W to be needed is determined. The angle α of the pillar section varies depending on resin materials, the shape of a retainer, and molding conditions. By providing the flat portion which satisfies the aforementioned relationship, the width W of the flat portion can be set in accordance with the angle α of the pillar section. Even if any resin material, any shape of a retainer, or any molding condition is set, the value of the necessary width W can be easily obtained from the above relationship.

The flat portion of the pillar section may be provided in the vicinity of a pitch circle diameter of the roller. The vicinity of the pitch circle diameter defines a region near an area where the pitch circle diameter is formed. In a case where the flat portion is provided in the vicinity of the pitch circle diameter, on the side face of the pillar section which serves as the inner face of the pocket, an outer diametric side recessed portion and an inner diametric side recessed portion are provided with the flat portion therebetween. The outer diametric side recessed portion continues from an outer diametric side edge of the flat portion to an outer diametric side to form a portion of recessed side face of the pillar section which serves as the inner face of the pocket, while the inner diametric side recessed portion continues from an inner diametric side edge of the flat portion to an inner diametric side to form another portion of recessed side face of the pillar section which serves as the inner face of the pocket. A radius of curvature of the outer diametric side recessed portion may be set larger than a radius of curvature of the inner diametric side recessed portion.

In this case, even if each of the pillar sections is tilted relative to the retainer axial center, the contact between the roller and the retainer is not offset. In this way, generation of the partial wear of the retainer can be reduced.

It is to be noted that in a case where each pillar section is tilted as described above and has no flat portion and a pocket has the same radius of curvature, because of no flat portion, a pocket measurement position at the tip portion of the pillar section does not become the maximum width of the pocket. Also, since the radius of curvature is the same, the contact between the roller and the retainer occurs only on the outer diametric side of the tip portion of the pillar section.

Any one or both of the radius of curvature of the outer diametric side recessed portion and the radius of curvature of the inner diametric side recessed portion may be changed gradually from the base end portion of the pillar section to the tip portion thereof. In this case, even if each of the pillar sections is tilted relative to the retainer axial center, the contact between the roller and the retainer is not offset. Accordingly, generation of the partial wear of the retainer can be reduced.

A double row cylindrical roller bearing of the present invention has the comb-shaped resin retainer of any of the present invention. The double row cylindrical roller bearing may be used as a bearing for the main shaft of a machine tool. A self-aligning roller bearing of the present invention has the comb-shaped resin retainer of any of the present invention.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1B is a front view of the essential portion of the comb-shaped resin retainer;

FIG. 5A is a side view of the essential portion of a comb-shaped resin retainer of a comparative example;

DESCRIPTION OF PREFERRED EMBODIMENTS

A first embodiment of the present invention will be described in conjunction with FIGS. 1A, 1B, and 2. A comb-shaped resin retainer according to this embodiment is applied to, for example, a double row cylindrical roller bearing which supports the main shaft of a machine tool, such as a CNC lathe, a machining center, a milling machine, a general-purpose lathe, and a boring machine. However, this comb-shaped resin retainer is not limited to the use of supporting the main shaft of the machine tool. Additionally, the comb-shaped resin retainer may be applied to a bearing other than the double row cylindrical roller bearing.

Figure 1A:
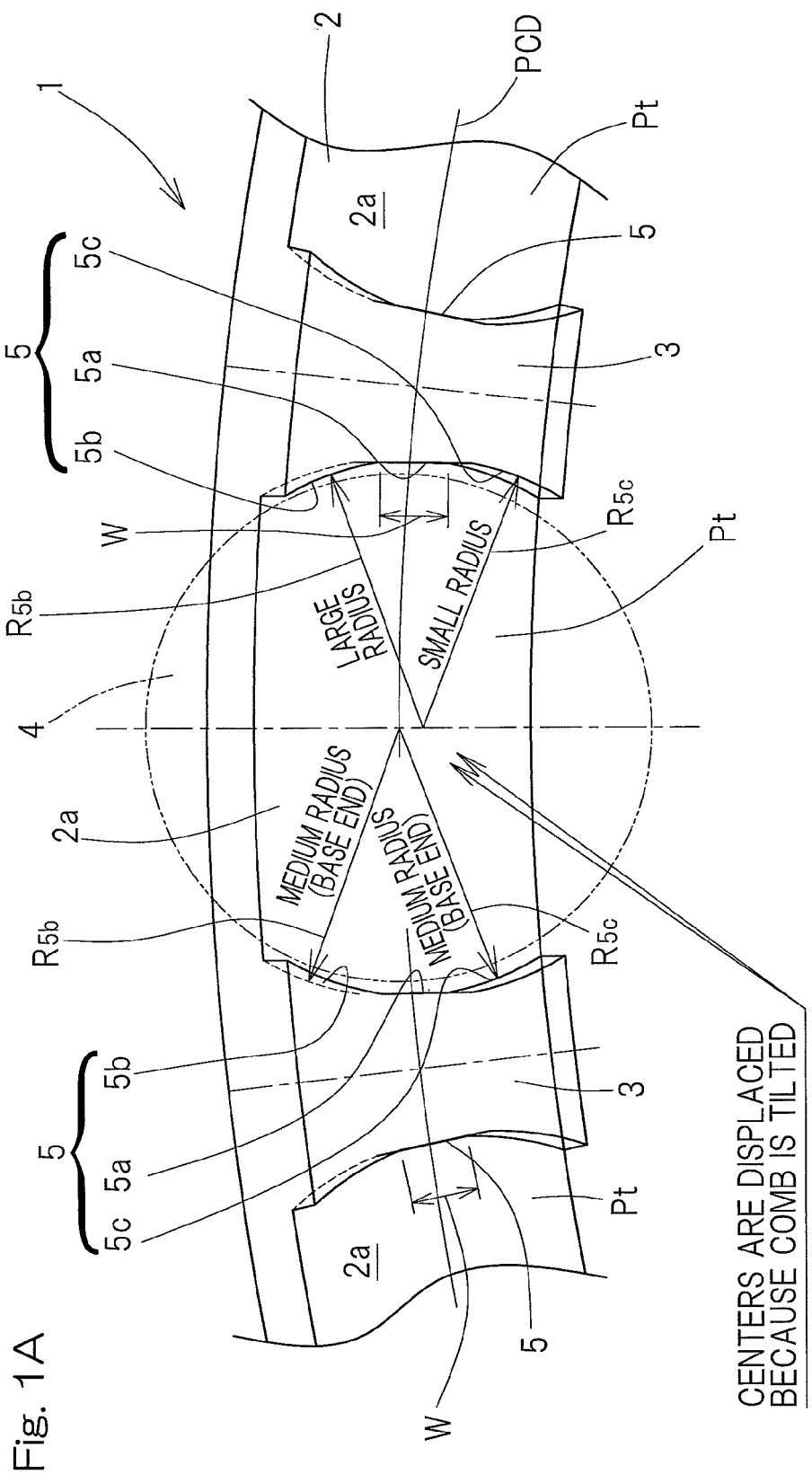
FIG. 1A is a side view of an essential portion of a comb-shaped resin retainer according to a first embodiment and a second embodiment of the present invention.

As shown in FIGS. 1A and 1B, a comb-shaped resin retainer 1 includes an annular section 2 and a plurality of pillar sections 3 which protrude to one side in the axial direction from one side face of the annular section 2. The annular section 2 and the pillar sections 3 are integrally formed by injection molding with, for example, synthetic resin. The plurality of pillar sections 3 are provided at the annular section 2 at certain intervals in a circumferential direction. A gap between the pillar sections 3, 3 adjacent to each other in the circumferential direction serves as a pocket Pt for retaining a cylindrical roller 4. Each of the pockets Pt is surrounded by one side face 2a of the annular section 2 and side faces 5, 5, of the circumferentially-adjacent pillar sections 3, 3, which oppose to each other. The comb-shaped resin retainer 1 has a comb-teeth shape which opens to one side in the axial direction. The side face 5 of the pillar section 3 which serves as an inner face of the pocket Pt is formed in a recessed shape in a cross section perpendicular to the retainer axial center.

For example, synthetic resin having self-lubricity, such as polyetheretherketone resin, polyamide resin, or polyphenylene sulfide resin is used as the synthetic resin. However, the synthetic resin is not limited to these synthetic resins. A filling material, such as carbon fiber or glass fiber may be combined with any of the above-described synthetic resin.

Each of the pillar sections 3 is tilted so as to become closer to the retainer axial center as the pillar section 3 extends toward the tip thereof. It is to be noted that in the illustrated example, an inner diametric peripheral surface of the annular section 2 and an outer diametric peripheral surface thereof are also tilted in the same manner as the pillar section 3, and that these peripheral surfaces continue so as to form the same cylindrical faces on an inner diametric peripheral surface of the pillar section 3 and an outer diametric side face thereof. An inclination angle α of the pillar section 3 varies dependent on resin materials, a shape of the retainer, and molding conditions. When these conditions are limited within a normal range, the inclination angle α is set, for example, between 5 degrees and 8 degrees.

A "flat portion" 5a is provided on the side face 5 of the pillar section 3 which serves as a portion of an inner face for the pocket Pt. This "flat portion" 5a refers to a portion in a cross section of the pillar section 3 perpendicular to the retainer axial center and seen in the axial direction. As shown in FIGS. 1A and 2, the flat portion 5a is formed linearly. The flat portion 5a of the pillar section 3 is provided in the vicinity of a pitch circle diameter (PCD) of the cylindrical roller 4. The vicinity of the PCD in this example also includes a region just on the PCD. This flat portion 5a continues axially from a tip portion of the pillar section 3 to the base end portion thereof. Moreover, the flat portions 5a, 5a which oppose in the pocket Pt are parallel to each other. A range in which the flat portion 5a exists may be called "a flat area".

As illustrated in FIG. 1B, when the side face of the pillar section 3, which serves as the inner face of the pocket Pt, is seen from the inner face side of the pocket Pt, the above-described flat area is a rectangular area surrounded by two sides L1, L2 which are parallel to each other in the inclination direction of the pillar section 3, one side L3 which forms a portion of a tip edge of the pillar section 3, and one side L4 which forms a portion of one side face of the annular section 2.

Figure 2:
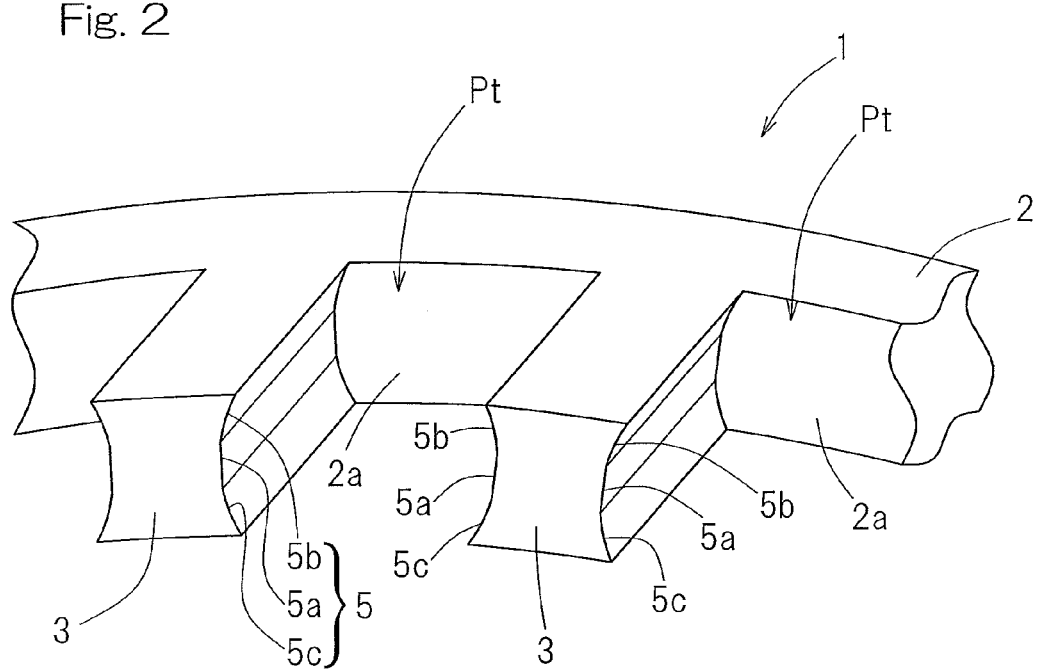
FIG. 2 is a perspective view of the essential portion of the comb-shaped resin retainer.

As shown in FIGS. 1A and 2, an outer diametric side recessed portion 5b and an inner diametric side recessed portion 5c are provided on the side face of the pillar section 3 to serve, together with the flat portion 5a, as the inner face of the pocket Pt. The outer diametric side recessed portion 5b and the inner diametric side recessed portion 5c refer to portions in a cross section of the pillar section 3 perpendicular to the retainer axial center and seen in the axial direction. The outer diametric side recessed portion 5b continues from the outer diametric side edge of the flat portion 5a to the outer diametric side, with the flat portion 5a as the boundary, to form a portion of recessed side face of the pillar section 3 which serves as the inner face of the pocket Pt. The outer diametric side recessed portion 5b is set to have a predetermined radius of curvature R5b.

The inner diametric side recessed portion 5c continues from the inner diametric side edge of the flat portion 5a to the inner diametric side, with the flat portion 5a as the boundary, to form a portion of recessed side face of the pillar section 3 which serves as the inner face of the pocket Pt is recessed. The inner diametric side recessed portion 5c is set to have a predetermined radius of curvature R5c. Here, the radius of curvature R5b of the outer diametric side recessed portion 5b is set larger than the radius of curvature R5c of the inner diametric side recessed portion 5c.

It is preferable that a radial width W of the flat portion 5a corresponds to the inclination angle α of the pillar section 3. As mentioned above, the flat portion 5a of the pillar section 3 is disposed in the vicinity of the PCD. When the radial width of the flat portion 5a of the pillar section 3 is represented by W, an inclination angle of the pillar section 3 relative to the retainer axial center is represented by α, and an axial length of the flat portion 5a is represented by L, it is preferable that the flat portion 5a satisfies the following relationship (1). Here, the width W is a widthwise dimension at an arbitrary axial position of the pillar section 3:

$$W > \tan \alpha \times L \quad (1)$$

When the axial length of the pillar section 3 becomes long, the necessary axial length L of the flat portion 5a also becomes long. Further, the angle of the pillar section 3 subjected to molding shrinkage is determined, the width W to be needed is determined. As described before, the angle α of the pillar section 3 varies depending on resin materials, the shape of a retainer, and molding conditions. By providing the flat portion 5a which satisfies the aforementioned relationship (1), the width W of the flat portion 5a can be set in accordance with the angle α of the pillar section 3. Even if any resin material, any shape of a retainer, or any molding condition is set, the value of the necessary width W can be easily obtained from the above relationship (1).

In accordance with the comb-shaped resin retainer 1 described above, in the comb-shaped resin retainer in which the side face 5 of the pillar section 3 which serves as the inner face of the pocket Pt is formed in a recessed shape, the flat portion 5a is provided on the side face 5 of the pillar section 3 which serves as the inner face of the pocket Pt. Thus, the maximum width of the pocket Pt can be measured at any axial position of the pillar section 3. The position at which the maximum width of the pocket Pt can be measured is shown by hatching in FIG. 1B. The above-described flat portion 5a continues axially from the tip portion of the pillar section 3 to the base end portion thereof. Accordingly, even when any pocket width of the pillar section 3 is measured at any axial position of the pillar section 3 from the tip portion of the pillar section 3 to the base end portion thereof, by measuring the flat portion 5a, the pocket width can be controlled accurately. Hence the pocket width and the gap of the roller 4 can be set so as not to change in the axial direction. Consequently, a uniform contact between the roller 4 and the retainer 1 can easily be obtained.

Furthermore, since each of the pillar sections 3 is tilted so as to become closer to the retainer axial center as the pillar section 3 extends toward the tip, the amount of movement of the roller 4 is not increased by the influence of centrifugal force, and the strong contact between the roller 4 and the retainer 1 can be prevented. As a result, the wear of the retainer 1 can be reduced. Also, because it is not necessary to carry out mold-adjustment of the comb-shaped resin retainer 1 multiple times, the manufacturing cost thereof can be reduced.

As described above, the flat portion 5a is provided in the vicinity of the pitch circle diameter. The outer diametric side recessed portion 5b continues from the outer diametric side edge of the flat portion 5a to the outer diametric side to form a portion of recessed side face of the pillar section 3 which serves as the inner face of the pocket Pt. The inner diametric side recessed portion 5c continues from the inner diametric side edge of the flat portion 5a to the inner diametric side to form a portion of recessed side face of the pillar section 3 which serves as the inner face of the pocket Pt. The radius of curvature R5b of the outer diametric side recessed portion 5b is set larger than the radius of curvature R5c of the inner diametric side recessed portion 5c. As a result, the following effects are performed.

Figure 5B:
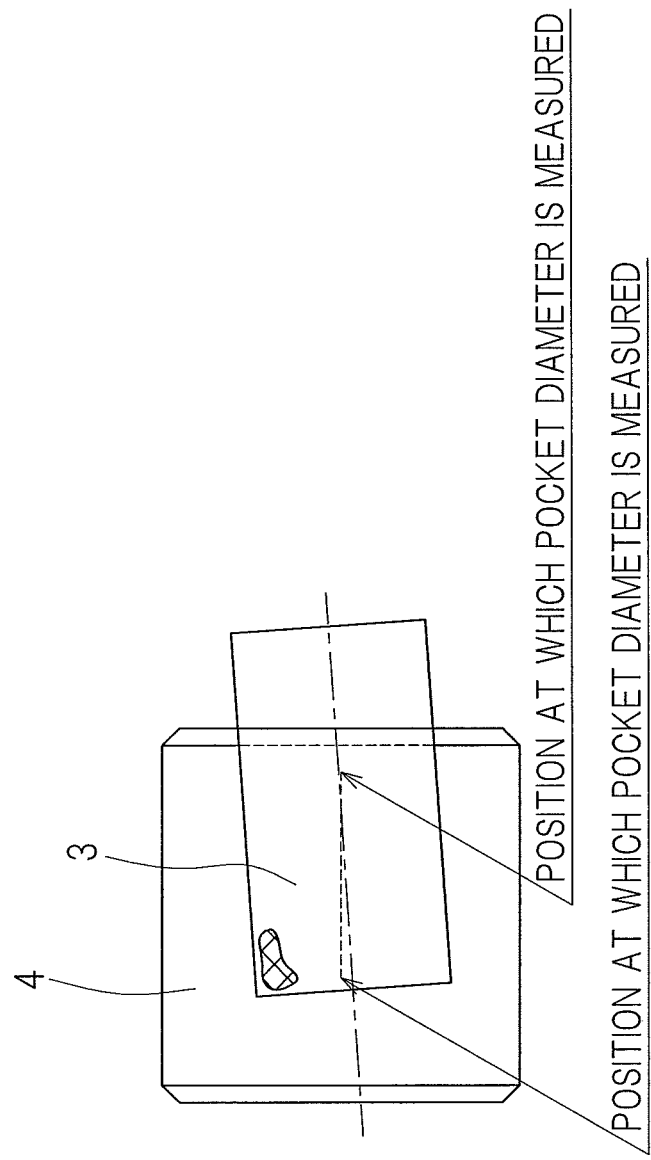
FIG. 5B is a front view of the essential portion of the comb-shaped resin retainer.
Figure 6A:
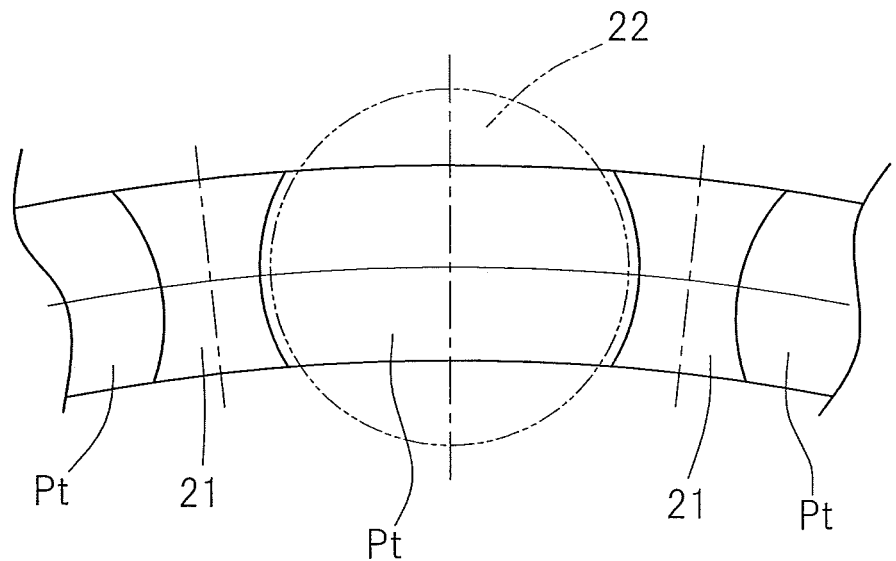
FIG. 6A is a side view of the essential portion of a comb-shaped resin retainer of a conventional example.
Figure 6B:
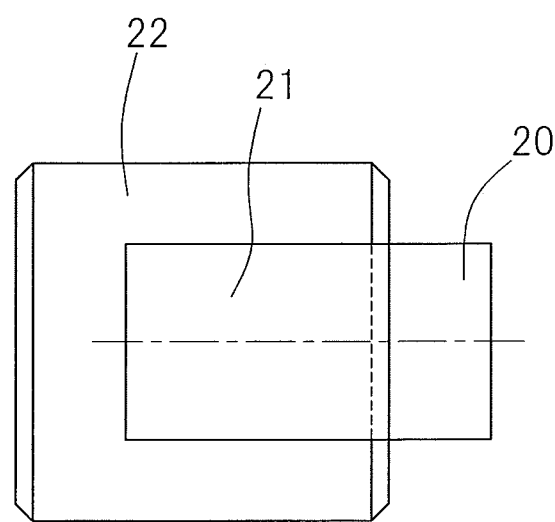
FIG. 6B is a front view of the essential portion of the comb-shaped resin retainer.

Even if each of the pillar sections 3 is tilted relative to the retainer axial center, the contact between the roller 4 and the retainer 1 is not radially offset. In this way, generation of the partial wear of the retainer 1 can be reduced. It is to be noted that in a comparative example illustrated in FIGS. 5A and 5B, each pillar section 3 is tilted as described above and has no flat portion and that the radius of curvature of a pocket Pt is uniform. In this case, because of no flat portion, a pocket measurement position at the tip portion of the pillar section 3 does not represent the maximum width of the pocket. Since the radius of curvature is uniform, the contact between the roller 4 and the retainer occurs only on the outer diametric side of the tip portion of the pillar section 3 (a location denoted by hatching in FIG. 5B).

As a second embodiment of the present invention, in the comb-shaped resin retainer shown in FIG. 1A, any one or both of the radius of curvature R5b of the outer diametric side recessed portion 5b and the radius of curvature R5c of the inner diametric side recessed portion 5c may be gradually changed from the base end portion of the pillar section 3 to the tip portion thereof. By increasing the radius of curvature of the an inner diametric side recessed portion 5c gradually from the base end portion to the tip portion thereof, the gap between the roller 4 and the retainer 1 can be set large on the tip portion side of the inner diametric side pocket and set small on the base end side thereof. By so changing, the pocket gap (in the radial direction) due to the deformation of the pillar section 3 during a high speed operation can be reduced equally on the tip portion and the base end portion. In this case, even if each of the pillar sections 3 is tilted relative to the retainer axial center, the contact between the roller 4 and the retainer 1 is not offset. Accordingly, generation of the partial wear of the retainer 1 can be reduced.

Figure 3:
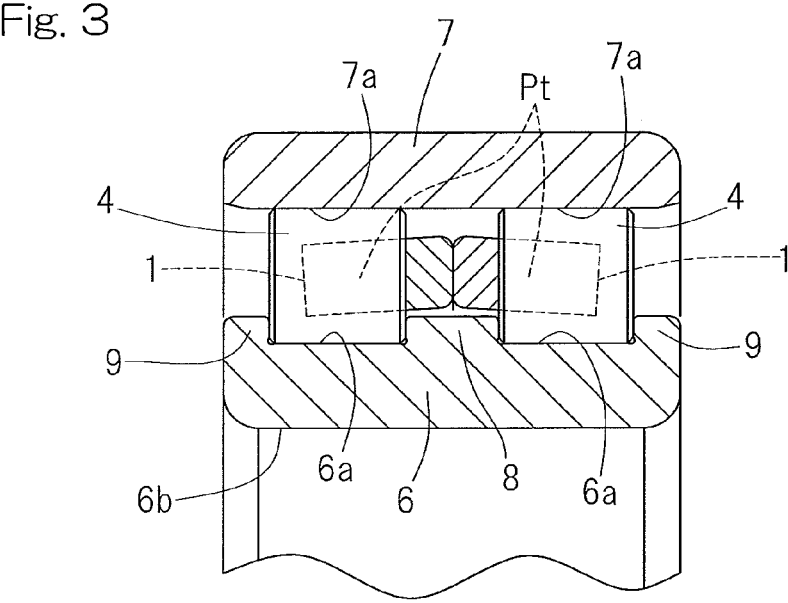
FIG. 3 is a longitudinal cross-sectional view of a double row cylindrical roller bearing which uses the comb-shaped resin retainer according to any of the precedent embodiments.

FIG. 3 is a longitudinal cross-sectional view of a double row cylindrical roller bearing which uses the comb-shaped resin retainer according to any of the above-described embodiments. The double row cylindrical roller bearing has an inner ring 6, an outer ring 7, and double row cylindrical rollers 4 which are provided between a raceway surface 6a of the inner ring 6 and a raceway surface 7a of the outer ring 7, and a pair of comb-shaped resin retainers 1, 1 which retain the respective cylindrical rollers 4. The inner ring 6 has double row raceway surfaces 6a, 6a. An inner rib 8 is provided at an axial center portion of the inner ring 6 and outer ribs 9, 9 are provided at the axial end portions thereof.

In the pair of comb-shaped resin retainers 1, 1, annular sections 2, 2 abut each other and a plurality of pillar sections 3 are disposed so that each of the pillar sections 3 protrudes from the annular section 2 of the comb-shaped resin retainer 1 toward the axial outer side. In this way, in the respective comb-shaped resin retainers 1, the cylindrical roller 4 is retained in the pocket Pt which opens from the axial center portion of the comb-shaped resin retainer 1 to the axial outer side thereof. Consequently, the comb-shaped resin retainer 1 can be prevented from falling off from the bearing. In addition, in the pair of comb-shaped resin retainers 1, 1, the pockets Pt on the axially opposite sides are disposed so as to be in the same phase in the circumferential direction. In this case, the comb-shaped resin retainers 1, 1 adopt a rolling element guidance form.

For example, the inner ring 6 is fit to the outer circumferential surface of a main shaft of a machine tool and the outer ring 7 is fit to the inner circumferential surface of a housing. In the example shown in FIG. 3, an inner ring inner circumferential surface 6b is formed in a cylindrical hole. However, the inner ring inner circumferential surface 6b may be formed in a tapered hole so as to be able to adjust a radial inner gap of the bearing. Grease lubrication, air-oil lubrication, or the like can be used as lubrication of the bearing.

In accordance with this double row cylindrical roller bearing, since the comb-shaped resin retainer 1 according to any one of the embodiments is used, the amount of movement of the roller 4 is stabilized, the wear of the retainer 1 is reduced, and the manufacturing cost thereof can be reduced. In particular, the flat portion 5a of the comb-shaped resin retainer 1 continues axially from the tip portion of the pillar section 3 to the base end portion thereof. Accordingly, even when any pocket width of the pillar section 3 is measured at any axial position of the pillar section 3 from the tip portion of the pillar section 3 to the base end portion thereof, by measuring the flat portion 5a, the pocket width can be controlled accurately. Since the pocket width and the gap of the roller 4 can be set so as not to change in the axial direction, a uniform contact between the roller 4 and the retainer 1 can easily occur. Accordingly, a high speed operation and a long servicing life of the bearing can be realized.

Figure 4:
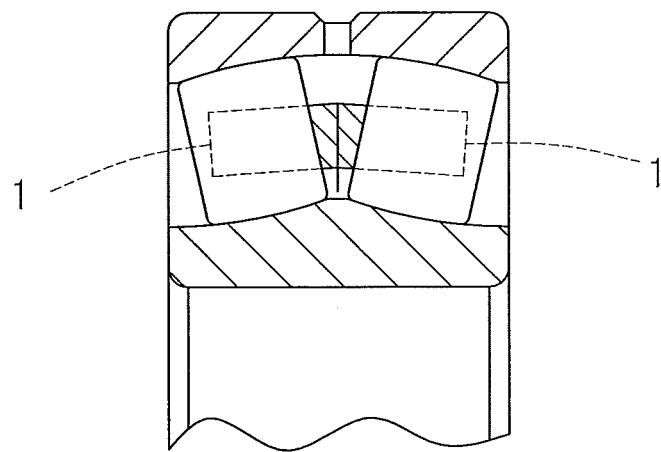
FIG. 4 is a longitudinal cross-sectional view of a self-aligning roller bearing which uses the comb-shaped resin retainer according to any of the above-described embodiments.

The comb-shaped resin retainer of any of the above-described embodiments may be applied to a single row cylindrical roller bearing. As illustrated in FIG. 4, the above comb-shaped resin retainer 1 can be used for a self-aligning roller bearing. A cylindrical rolling bearing or a self-aligning roller bearing using the above comb-shaped resin retainer can be applied, for example, to a purpose of supporting each shaft of a robot, a conveying device, a transportation machine, or the like.

Although the present invention has been fully described in connection with the preferred embodiments thereof with reference to the accompanying drawings which are used only for the purpose of illustration, those skilled in the art will readily conceive various changes and modifications within the framework of obviousness upon reading of the specification herein presented of the present invention. Accordingly, such changes and modifications are, unless they depart from the scope of the present invention as delivered from the claims annexed hereto, to be construed as included therein.

REFERENCE NUMERALS

1 . . . comb-shaped resin retainer
2 . . . annular section
3 . . . pillar section
4 . . . cylindrical roller
5 . . . side face
5a . . . flat portion
5b . . . outer diametric side recessed portion
5c . . . inner diametric side recessed portion
Pt . . . pocket

What is claimed is:

1. A comb-shaped resin retainer comprising:
an annular section; and a plurality of pillar sections which protrude to one side in an axial direction from one side face of the annular section,
wherein a gap between the pillar sections adjacent to each other in a circumferential direction serves as a pocket for retaining a cylindrical roller having an axial center line parallel to a retainer axial center line, and a side face of the pillar section, which serves as an inner face of the pocket, is formed in a recessed shape, wherein each of the pillar sections is tilted so as to become closer to a retainer axial center as the pillar section extends toward a tip of the pillar section, and a flat portion is provided on the side face of the pillar section which serves as the inner face of the pocket, and the flat portion continues axially from a tip portion of the pillar section toward a base end portion thereof, and the opposing flat portions of the pillar sections are in parallel to each other.

2. The comb-shaped resin retainer according to claim 1, wherein the flat portion of the pillar section is provided in a vicinity of a pitch circle diameter of the roller.

3. A double row cylindrical roller bearing comprising the comb-shaped resin retainer claimed in claim 1.

4. The double row cylindrical roller bearing according to claim 3, wherein the double row cylindrical roller bearing is used as a bearing for a main shaft of a machine tool.

5. A comb-shaped resin retainer comprising:
an annular section; and
a plurality of pillar sections which protrude to one side in an axial direction from one side face of the annular section,
wherein a gap between the pillar sections adjacent to each other in a circumferential direction serves as a pocket for retaining a roller, and a side face of the pillar section, which serves as an inner face of the pocket, is formed in a recessed shape,
wherein each of the pillar sections is tilted so as to become closer to a retainer axial center as the pillar section extends toward a tip of the pillar section, and a flat portion is provided on the side face of the pillar section which serves as the inner face of the pocket, and the flat portion continues axially from a tip portion of the pillar section toward a base end portion thereof, and the opposing flat portions of the pillar sections are in parallel to each other, and
wherein when a radial width of the flat portion of the pillar section is represented by W, an inclination angle of the pillar section relative to the retainer axial center is represented by $\alpha$, and an axial length of the flat portion is represented by L, the flat portion has a following relationship:

$W > \mathrm{Tan}\, \alpha \times L$.

6. A self-aligning roller bearing comprising the comb-shaped resin retainer claimed in claim 5.

7. A comb-shaped resin retainer comprising:
an annular section; and
a plurality of pillar sections which protrude to one side in an axial direction from one side face of the annular section,
wherein a gap between the pillar sections adjacent to each other in a circumferential direction serves as a pocket for retaining a roller, and a side face of the pillar section, which serves as an inner face of the pocket, is formed in a recessed shape,
wherein each of the pillar sections is tilted so as to become closer to a retainer axial center as the pillar section extends toward a tip of the pillar section, and a flat portion is provided on the side face of the pillar section which serves as the inner face of the pocket, and the flat portion continues axially from a tip portion of the pillar section toward a base end portion thereof, and the opposing flat portions of the pillar sections are in parallel to each other,
wherein the flat portion of the pillar section is provided in a vicinity of a pitch circle diameter of the roller,
wherein on the side face of the pillar section which serves as the inner face of the pocket, an outer diametric side recessed portion and an inner diametric side recessed portion are provided with the flat portion therebetween, and the outer diametric side recessed portion continues from an outer diametric side edge of the flat portion to an outer diametric side to form a portion of recessed side face of the pillar section which serves as the inner face of the pocket, while the inner diametric side recessed portion continues from an inner diametric side edge of the flat portion to an inner diametric side to form another portion of recessed side face of the pillar section which serves as the inner face of the pocket, and
wherein a radius of curvature of the outer diametric side recessed portion is set larger than a radius of curvature of the inner diametric side recessed portion.

8. The comb-shaped resin retainer according to claim 7, wherein any one or both of the radius of curvature of the outer diametric side recessed portion and the radius of curvature of the inner diametric side recessed portion is/are changed gradually from the base end portion of the pillar section to the tip portion thereof.

9. A self-aligning roller bearing comprising the comb-shaped resin retainer claimed in claim 7.

* * * * *